United States Patent Office 2,798,068
Patented July 2, 1957

2,798,068

SERIES OF NEW N - (5 - NITRO - 2 - FURYL)ALKYL-IDENE-3-AMINO- 5 -TERTIARYAMINOMETHYL-2-OXAZOLIDONES AND SALTS THEREOF

Gabriel Gever, Oxford, N. Y., assignor to The Norwich Pharmacal Company, Norwich, N. Y., a corporation of New York No Drawing. Application July 18, 1956,
Serial No. 598,506

6 Claims. (Cl. 260—240)

This invention relates to a new series of chemical compounds which exhibit a high order of in vivo chemotherapeutic effectiveness against microbial infections upon oral administration and which are well tolerated by the host when so administered. It is a further feature of this invention that the acid addition and quaternary ammonium salts of this new series of compounds are effective upon oral administration, and also lend themselves to effective parenteral therapy. This new series of chemical compounds consists of a number of closely related N-(5-nitro-2-furyl) alkylidene-3-amino-5-tertiary-aminomethyl-2-oxazolidones and the acid addition and quaternary ammonium salts thereof. They are described by the general formula:

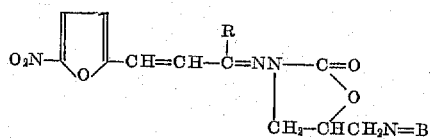

wherein:

R represents a member of the group consisting of hydrogen and methyl,

—N=B represents a member of the group consisting of di-lower-alkylamino, piperidyl, pyrrolidyl and morpholinyl, and the acid addition and alkyl halide quaternary ammonium salts thereof.

This application is a continuation-in-part of my copending application Serial No. 373,672, filed August 11, 1953, now abandoned.

I have discovered that the members of my new series of compounds possess a high order of activity against a variety of microorganisms including both gram-positive and gram-negative species. Such activity is measured by the serial dilution technique commonly employed in testing antimicrobial substances. The following table shows the results of such testing of a member of my new series, namely N-[3-(5-nitro-2-furyl)-2-propen-1-ylidene]-3-amino-5-(1-pyrrolidylmethyl)-2-oxazolidone:

TABLE I

| Species | Minimum Inhibitory Concentration in mg./percent |
|---|---|
| Salmonella typhosa | 0.3 |
| Salmonella choleraesuis | 0.3 |
| Pasturella avicida | 0.6 |
| Endamoeba histolytica | 0.3 |
| Streptococcus pyogenes | 0.07 |
| Staphylococcus aureus | 0.1 |
| Escherichia coli | 0.07 |

My new compounds permit as astonishingly effective therapeutic treatment of animals lethally infected with organisms such as *Salmonella typhosa* and *Micrococcus pyogenes* var. *aureus*. The dosage of the various members of this series needed to bring about an effective chemotherapeutic result is well within tolerable range and provokes no manifestation of toxic effects. For instance, when members of my new series of compounds were fed to mice lethally infected with either of the aforementioned bacteria at dosage levels within the range of 100–200 mg./kg. in divided amounts spaced, for example at ½ hour, 6 hours and 12 hours post infection, effective protection of from 40–100% of the mice so treated was obtained. In some instances a single dose of from 100–200 mg./kg. served to provoke a like chemotherapeutic result. Doses from 600–1700 mg./kg. are completely tolerated by mice.

I have discovered also that salts of the aforesaid basic compounds of this series, produced by reaction with an inorganic acid such as hydrochloric and sulfuric or an organic acid such as penicillin, or by quaternization with alkyl halides, retain the highly effective chemotherapeutic attributes of the basic compound when administered per os to animals lethally infected with pathogenic organisms and in addition lend themselves to the parenteral mode of administration.

Among these acid addition salts, the penicillin salt produced by the reaction of penicillin G with, for example, N-(-3-(5-nitro-2-furyl)-2-propen - 1 - ylidene)-3-amino-5-(1-pyrrolidyl)-2-oxazolidone has been found to yield astonishingly excellent results when administered to animals lethally infected with pathogenic bacteria. While the penicillin salt recited here by way of illustration refers to penicillin G, other penicillins such as penicillin K, F, X and dihydro F, or mixtures of two or more of these as obtained from the mold-growth methods of obtaining "penicillin" are operative and are included within the scope of this invention.

A similar achievement of chemotherapeutic effectiveness is obtained upon using the hydrochloride salt of the aforementioned basic compound. This salt can be administered per os in the manner referred to above in the case of the basic compound or the penicillin salt thereof and, like the penicillin adduct, can be administered parenterally, offering an even greater water solubility for use by this route.

My new compounds can be easily compounded in appropriate pharmaceutical dosage forms for oral administration as chemotherapeutic agents. Such forms include tablets, powders, capsules and suspensions wherein the excipients common to pharmaceutical practice are employed. They are also readily used as prophylactic agents in the treatment of diseases of domestic animals when incorporated in the feed or water supply, and thus are peculiarly valuable in the field of veterinary medicine.

The members of my new series of compounds can be produced in good yield through the reaction of 3-(5-nitro-2-furyl)acrolein or 5-nitro-2-furfurylideneacetone with the appropriate 3-amino-5-tertiaryaminomethyl-2-oxazolidone.

In order that my invention may be entirely available to those skilled in the art, methods of making a number of the new compounds of the series are described briefly:

*Example 1.*—*N-[3-(5-nitro-2-furyl)-2-propen-1-ylidene]-3-amino-5-(1-pyrrolidylmethyl)-2-oxazolidone*

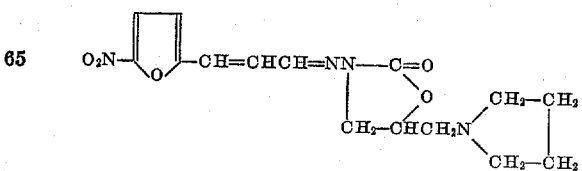

To 50 g. of epichlorohydrin at 0° C. is slowly added 40 g. of pyrrolidine, keeping the temperature at 0–5° C. The solution is stirred at 0–10° C. for thirty minutes and at 30–35° C. for one hour. The reaction mixture is washed with 125 cc. of 20% potassium carbonate solution and then stirred with 75 cc. of 36% sodium hydroxide solution for one hour. The resulting oil is separated and the aqueous layer extracted with 100 cc. of ether. The combined organic layers are dried over KOH, the ether removed and the residual oil distilled in vacuo. There is obtained 39 g. of 3-(1-pyrrolidyl)-1,2-epoxypropane, B. P. 78° C. at 20 mm.

The 39 g. of 3-(1-pyrrolidyl)-1,2-epoxypropane is added dropwise to 80 g. of hydrazine hydrate keeping the temperature at 90–100° C. The solution is heated on a steam bath for one hour and the excess hydrazine hydrate is removed in vacuo. To the residue are added 44 g. of diethyl carbonate and a solution of 1.0 g. of sodium in 19 cc. of methanol. The reaction mixture is heated, the alcohol formed by the reaction being slowly distilled. After about two hours the viscous residue is distilled in vacuo. There is obtained 14.8 g. of 3-amino-5-(1-pyrrolidylmethyl)-2-oxazolidone, B. P. 163–167° C. at 2.5 mm.

5.7 g. of 3-amino-5-(1-pyrrolidylmethyl)-2-oxazolidone is dissolved in 195 cc. of water and acidified with concentrated hydrochloric acid. A solution of 5.72 g. of 3-(5-nitro-2-furyl) acrolein in 256 cc. of alcohol, clarified with charcoal ("Norit"), is added; the resulting mixture is heated to 50° C., cooled and made alkaline with concentrated ammonium hydroxide solution. The resulting solid is removed by filtration, washed with aqueous alcohol and recrystallized from alcohol-nitromethane (117:39). There is obtained 7.3 g. of 3-[3-(5-nitro-2-furyl)-2-propen-1-ylideneamino]-5-(1-pyrrolidylmethyl) - 2-oxazolidone, M. P. 211–212° C. (decomposition).

The hydrochloride is prepared by suspending 7.3 g. of the above compound in 73 cc. of absolute alcohol, adding 30 cc. of concentrated hydrochloric acid, heating to boiling and cooling. The resulting solid is removed by filtration and washed with alcohol. The 8.07 g. of hydrochloride does not melt when heated to 300° C.

The penicillin G salt is prepared by adding a solution of 8.22 g. of potassium penicillin G in 72 cc. of water to a solution of 8.07 g. of the above hydrochloride in 360 cc. of water. The resulting solution is cooled in an ice bath, filtered and the filtrate concentrated to about 72 cc. The resulting penicillin G salt is removed by filtration, washed with a minimum of ice water and after drying over phosphorous pentoxide in vacuo weighs 12.85 g., M. P. 129–131° C.

*Example II.—N-[3-(5-nitro-2-furyl)-2-propen-1-ylidene]-3-amino-5-dimethylaminomethyl-2-oxazolidone*

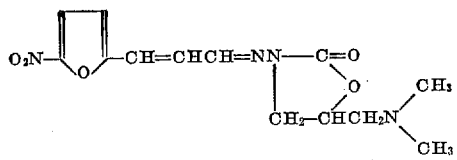

To a solution of 185 g. of epichlorohydrin in 500 cc. of ether and 10 cc. of water is added during 86 minutes 88.5 g. of dimethylamine, keeping the temperature at 27–29° C. The solution is stirred at this temperature for 4½ hours. The ether is removed in vacuo at 10–12° C., the residue dissolved in 250 cc. of alcohol with cooling, and added to 500 g. of hydrazine hydrate at 75° C. The addition is carried out over 40 minutes allowing the temperature to increase to 81° C. The resulting mixture is heated at 90–93° C. and the alcohol distilled off. The remaining alcohol and excess hydrazine hydrate are removed in vacuo and the residue is dissolved in 400 cc. of methanol and treated with a solution of 112 g. of potassium hydroxide in 500 cc. of methanol. The precipitated potassium chloride is filtered off and washed with methanol. The methanolic solution is distilled to remove the solvent and the residue distilled in vacuo. There is obtained 156.5 g. of 1-hydrazino-3-dimethylamino-2-propanol, B. P. 99° C. at 2 mm.

To a mixture of 156.5 g. of 1-hydrazino-3-dimethylamino-2-propanol and 153 g. of diethyl carbonate is added a solution of 4.5 g. of sodium in 100 cc. of methanol. The resulting mixture is heated with stirring in a bath beginning at 110° C. and rising during two hours to 130° C., the alcohol formed by the reaction being slowly distilled. The residue is distilled in vacuo to remove the remaining alcohol and excess diethyl carbonate. The residue is dissolved in 2530 cc. of water, acidified with concentrated hydrochloric acid and treated with 117.7 g. of 3-(5-nitro-2-furyl) acrolein in 5400 cc. of alcohol. The mixture is heated at 50–60° C. for ten minutes, cooled and made alkaline with concentrated ammonium hydroxide solution. The resulting solid is removed by filtration, washed with water and alcohol and recrystallized from alcohol-nitromethane (5540:1880). There is obtained 108 g. of N-[3-(5-nitro-2-furyl)-2-propen - 1 - ylideneamino] - 5 - dimethylaminomethyl-2-oxazolidone, M. P. 216–217° C. (decomposition).

The hydrochloride is prepared by suspending 0.18 g. of the above compound in 5 cc. of warm absolute alcohol, acidifying with several drops of concentrated hydrochloric acid and cooling. The resulting solid is removed by filtration and recrystallized from alcohol, yielding 0.13 g. of yellow solid melting at 247–249° C. (decomposition).

*Example III.—N-[4-(5-nitro-2-furyl)-3-buten-2-ylidene]-3-amino-5-diethylamino-methyl-2-oxazolidone*

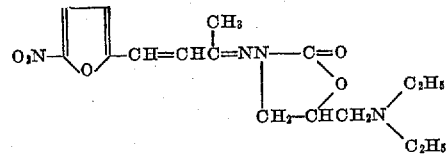

To 200 g. of hydrazine hydrate at 55° C. is added 111 g. of 1-diethylamino-2,3-epoxypropane (Eisleb, U. S. 1,790,042) over twenty-five minutes allowing the temperature to increase to 92° C. The resulting solution was heated on the steam bath for 15 minutes and then the excess hydrazine hydrate removed in vacuo. The residue was distilled in vacuo to yield 94 g. of 1-hydrazino-3-diethylamino-2-propanol, B. P. 93–101° C. at 0.5–0.8 mm.

To a mixture of 94 g. of 1-hydrazino-3-diethylamino-2-propanol and 76 g. of diethyl carbonate is added, in one portion, 5.13 g. of dry sodium methoxide. This mixture is heated, with stirring, in an oil bath for 2 hours, at a bath temperature rising from 110° to 113° C. The hot residue is then pumped free of volatile material on the vacuum pump leaving 111 g. of residue. 10 g. of this residue is dissolved in 10% sulfuric acid and treated with excess barium carbonate. The precipitates of barium sulfate and carbonate are filtered and washed well with water. The clear aqueous solution is evaporated on the steam bath and then dried over KOH in vacuo. 6.7 g. of the viscous syrup that remained is distilled in vacuo, giving 2.7 g. of 3-amino-5-diethylaminomethyl-2-oxazolidone, B. P. 138.5° C. at 1.6 mm.

1.1 g. of 3-amino-5-diethylaminomethyl-2-oxazolidone is dissolved in 22 cc. of absolute alcohol and to this solution is added a mixture of 0.034 g. of iodine in 5 cc. of acetic acid and 2 cc. of absolute alcohol. This mixture is then added to a solution of 0.967 g. of 5-nitro-2-furfurylideneacetone in 22 cc. of absolute alcohol. The mixture is refluxed for 3⅔ hours, concentrated to one-half the volume and then diluted with 50 cc. of water. After treating the solution with charcoal ("Norit") the solution is made alkaline with concentrated ammonium hydroxide solution. The resulting solid is filtered off, washed with water and recrystallized from isopropanol.

There is obtained 0.56 g. of N-[4-(5-nitro-2-furyl)-3-buten - 2-ylideneamino]-5-diethylaminomethyl-2-oxazolidone, M. P. 120.5–121.5° C.

The hydrochloride and penicillin salts may be prepared, respectively, according to the procedure described under Example I.

*Example IV.—N-[4-(5-nitro-2-furyl)-3-buten-2-ylidene] 3-amino-5-(4-morpholinylmethyl)-2-oxazolidone*

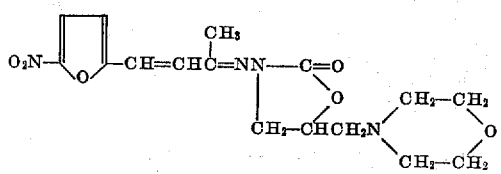

To a mixture of 161 g. of 1-hydrozino-3-morpholinyl-2-propanol (prepared from hydrazine hydrate and 3-(N-morpholinyl)-1,2-epoxypropane) and 118 g. of diethyl carbonate is added in one portion, with vigorous stirring, 8.5 g. of dry sodium methoxide. The solution turns green and a large amount of heat is liberated. The solution is stirred for one hour and then cooled. The precipitate which forms is removed by filtration and washed well with ether, giving a yield of 152 g., M. P. 114–116° C. Recrystallization from 900 cc. of isopropanol gives 120 g. of pure 3-amino-5-(4-morpholinylmethyl)-2-oxazolidone, M. P. 120° C.

40.2 g. of 3-amino-5-(4-morpholinylmethyl)-2-oxazolidone is dissolved in 835 cc. of absolute alcohol and to this solution is added a mixture of 1.23 g. of iodine in 181 cc. of acetic acid and 72 cc. of absolute alcohol. This mixture is then added to a solution of 36.2 g. of 5-nitro-2-furfurylideneacetone in 835 cc. of absolute alcohol. The mixture is refluxed for three hours, diluted with 1900 cc. of water and cooled. The filtered solution is made alkaline with saturated aqueous sodium carbonate solution. The resulting solid and that obtained by concentrating the filtrate are combined and purified by recrystallization from isopropanol and benzene. There is obtained 18.78 g. of 3-[4-(5-nitro-2-furyl)-3-buten-2-ylideneamino] - 5-(4-morpholinylmethyl)-2-oxazolidone, M. P. 170–172° C.

The hydrochloride and penicillin salts may be prepared in the manner described in Example I.

*Example V.—N-[4-(5-nitro-2-furyl)-3-buten-2-ylidene]-3-amino-5-(4-morpholinylmethyl)-2-oxazolidone methiodide*

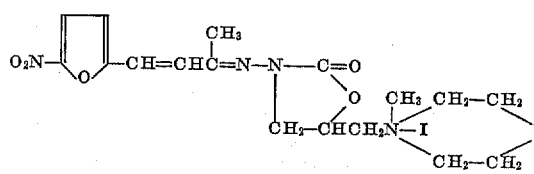

A mixture of 4.76 g. of 3-[4-(5-nitro-2-furyl)-3-butene-2-ylideneamino]-5-(4 - morpholinylmethyl) - 2 - oxazolindone, 9.75 g. of methyliodide and 60 cc. of acetonitrile is refluxed for two hours and twenty-five minutes. The reaction mixture is cooled and the solid removed by filtration. The filtrate is evaporated to give more crude solid which is washed with chloroform and methanol. The combined crude solids are recrystallized from methanol to yield 4.03 g. of product, M. P. 199–200° C.

*Example VI.—N-[3-(5-nitro-2-furyl)-2 - propen - 1 - ylidene]-3-amino-5-(4-morpholinylmethyl)-2 - oxazolidone*

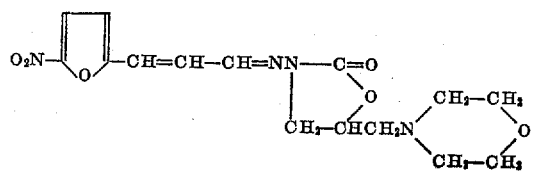

21.6 g. of 3-amino-5-(4-morpholinylmethyl)-2-oxazolidone (prepared as described in Example IV) is dissolved in 400 cc. of water and acidified with concentrated hydrochloric acid. A solution of 17.95 g. of 3-(5-nitro-2-furyl) acrolein in 72.5 cc. of absolute alcohol, clarified with "Norit," is added. The mixture was heated on the steam bath, cooled, and the hydrochloride salt of the product is filtered off and washed with ether. There is obtained 34.1 g. of hydrochloride.

The hydrochloride is dissolved in 1330 cc. of hot water, filtered hot; made alkaline with concentrated ammonium hydroxide, cooled and the solid filtered off. After recrystallization from alcohol-nitromethane (300:260) there is obtained 25.34 g. of 3-[3-(5-nitro-2-furyl)-2-propen-1-ylideneamino]-5-(4-morpholinylmethyl) - 2 - oxazolidone, M. P. 230–233° C.

The hydrochloride and penicillin salts may be prepared as described in Example I.

*Example VII.—N-[4-(5-nitro-2-furyl)-2 - butene-2 - ylidene]-3-amino-5-(1-piperidyl)-methyl-2-oxazolidone*

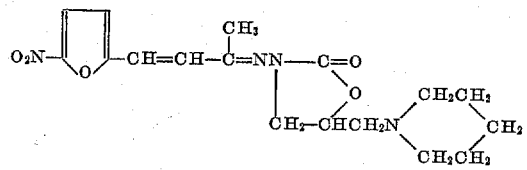

To 23 g. of hydrazine hydrate (100%) at 80° C. is added with stirring 12 g. of 3-(1-piperidyl)-1,2-epoxypropane (Eisleb, U. S. 1,790,042) at such a rate that the temperature is maintained at 80–90° C. without external cooling. The resulting solution is heated on the steam bath for two hours and then the excess hydrazine hydrate removed in vacuo.

To the residual oil is added 8 grams of diethyl carbonate and a solution of 0.1 g. of sodium in 3 cc. of methanol. The reaction mixture is then heated, the alcohol formed in the reaction being slowly removed by distillation. After about two hours the mixture is cooled. The solid which precipitates is removed by filtration, washed with absolute alcohol and then with ether. Yield 44%, M. P. 128–129° C.

One g. (.0050 mole) 3-amino-5-(1-piperidyl) methyl-2-oxazolidone is dissolved in 50 ml. of absolute alcohol by warming in an Erlenmeyer flask fitted with a reflux condenser on the steam bath. To this solution is added a few crystals of iodine dissolved in 5 ml. glacial acetic acid. One g. (.0055 mole) 5-nitro-2-furfurylideneacetone is then dissolved in 50 ml. absolute alcohol by warming and added to the solution. The yellow solution which results is refluxed on the steam bath for 1½ to 2 hours. The solution slowly becomes a deep, reddish-orange color. The reaction mixture is then diluted with an equal volume of water, cooled in an ice water bath and aqueous, saturated sodium carbonate solution added in small portions until the yellow cloudiness, which soon forms, is no longer discharged by stirring. Upon further cooling an orange-yellow precipitate separates. This is filtered off, washed with a small amount of water, dried, and recrystallized from isopropyl alcohol. About 0.5 g. (30%) of yellow product is obtained, M. P. 151–152° C.

The hydrochloride and penicillin salts may be prepared as described under Example I.

What I claim is:

1. A member of the group consisting of a compound having chemotherapeutic activity on oral administration and represented by the formula:

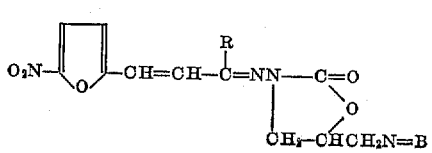

wherein:

R represents a member of the group consisting of hydrogen and methyl,

N=B represents a member of the group consisting of di-lower-alkylamino, piperidyl, pyrrolidyl, and morpholinyl, and the acid addition an dalkyl halide quaternary ammonium salts thereof.

2. N - [3 - (5 - nitro - 2 - furyl) - 2 - propen - 1-ylidene] - 3 - amino - 5 - (1 - pyrrolidylmethyl) - 2-oxazolidone represented by the formula:

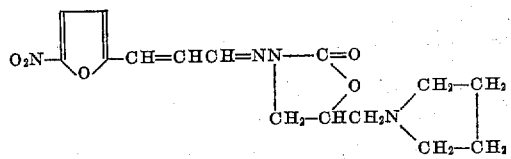

3. N - [4 - (5 - nitro - 2 - furyl) - 3 - buten - 2-ylidene] - 3 - amino - 5 - diethylaminomethyl - 2 - oxazolidone represented by the formula:

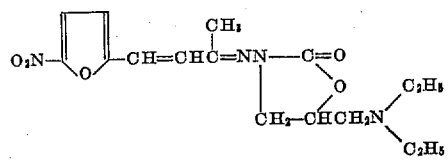

4. N - [4 - (5 - nitro - 2 - furyl) - 3 - buten - 2-ylidene] - 3 - amino - 5 - (4 - morpholinylmethyl) - 2-oxazolidone represented by the formula:

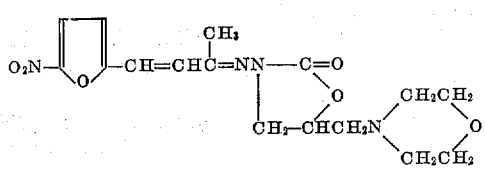

5. N - [3 - (5 - nitro - 2 - furyl) - 2 - propen - 1-ylidene] - 3 - amino - 5 - (4 morpholinylmethyl) - 2-oxazolidone represented by the formula:

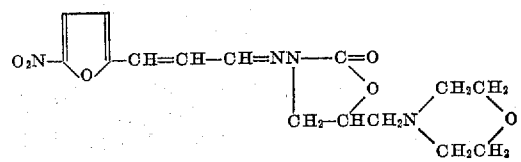

6. N - [4 - (5 - nitro - 2 - furyl) - 2 - butene - 2-ylidene] - 3 - amino - 5 - (1 - piperidyl)methyl - 2-oxazolidone represented by the formula:

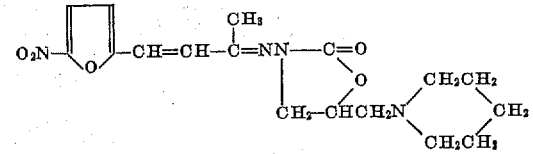

No references cited.

UNITED STATES PATENT OFFICE

CERTIFICATE OF CORRECTION atent No. 2,798,068                                                        July 2, 1957

Gabriel Gever

It is hereby certified that error appears in the printed specification of the above numbered patent requiring correction and that the said Letters Patent should read as corrected below.

Column 1, line 69, for "permit as" read --permit an--; column 2, line :, after "within" insert --a--; column 3, line 9, for "780 C." read --78° C.--; column 7, line 8, for "an dalkyl" read --and alkyl--.

Signed and sealed this 5th day of November 1957.

(SEAL)
Attest:
KARL H. AXLINE
Attesting Officer

ROBERT C. WATSON
Commissioner of Patents